Dec. 16, 1958 S. J. SCHANTZ 2,864,626
TRAILER HAVING VERTICALLY ADJUSTABLE HITCH AND RUNNING GEAR
Filed Sept. 19, 1955 3 Sheets-Sheet 1
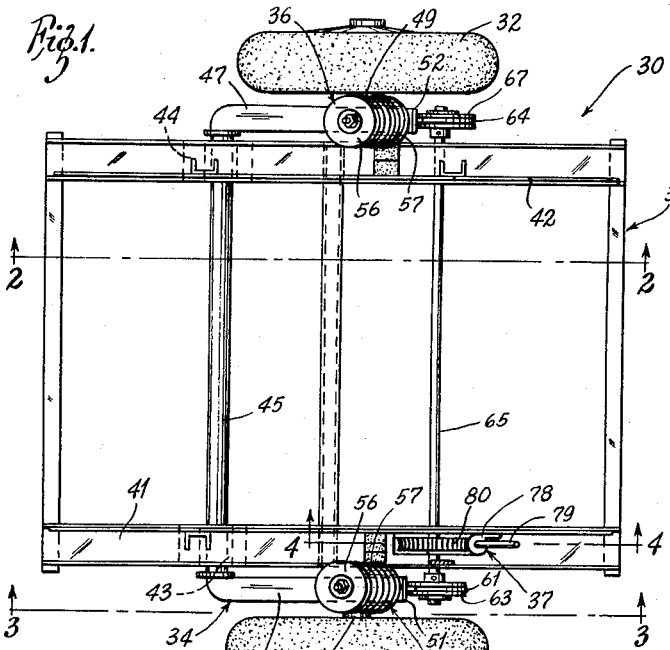
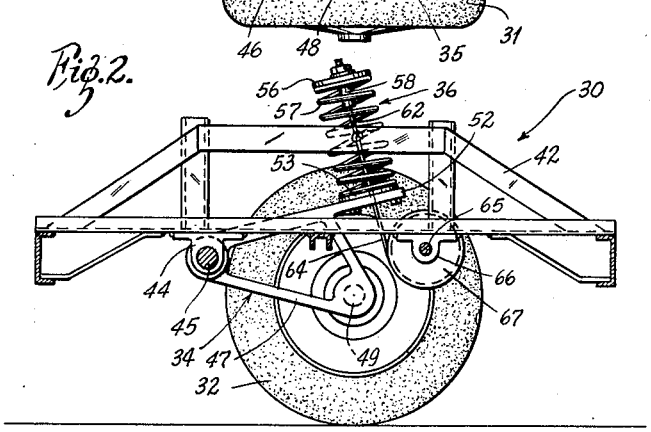
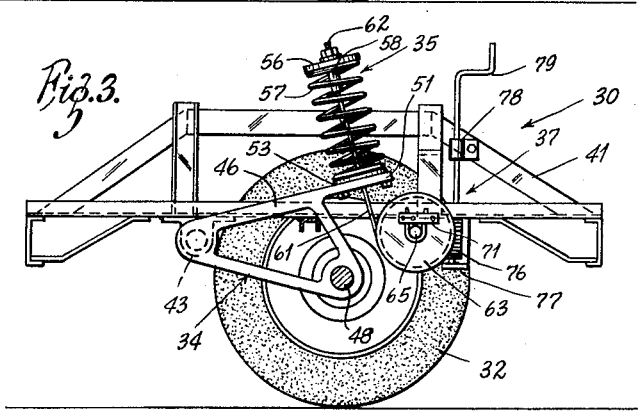
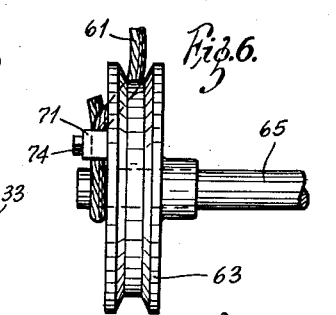
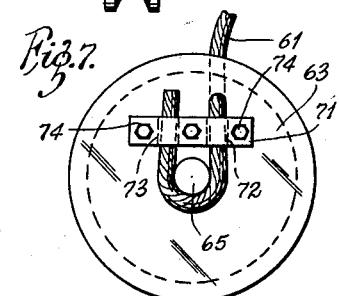
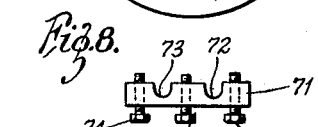
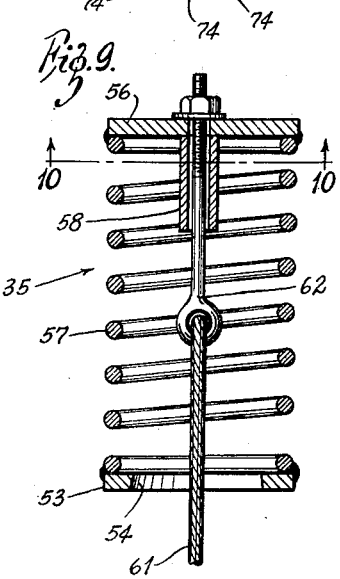
INVENTOR:
SOCRATES J. SCHANTZ
BY Kingsland, Rogers & Ezell
ATTORNEYS Dec. 16, 1958 S. J. SCHANTZ 2,864,626
TRAILER HAVING VERTICALLY ADJUSTABLE HITCH AND RUNNING GEAR
Filed Sept. 19, 1955 3 Sheets-Sheet 2
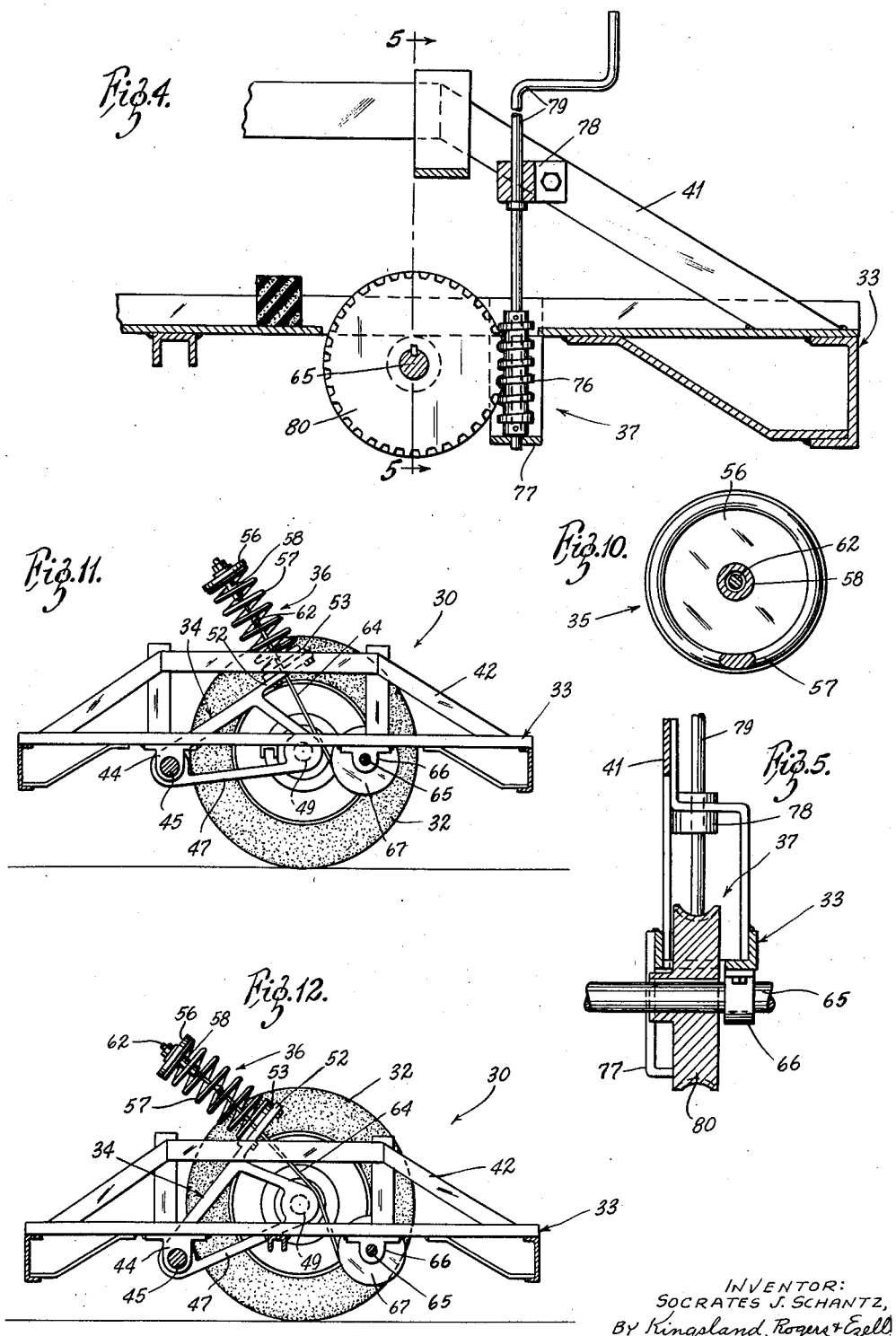
INVENTOR:
SOCRATES J. SCHANTZ,
BY Kingsland, Rogers & Ezell
ATTORNEYS.

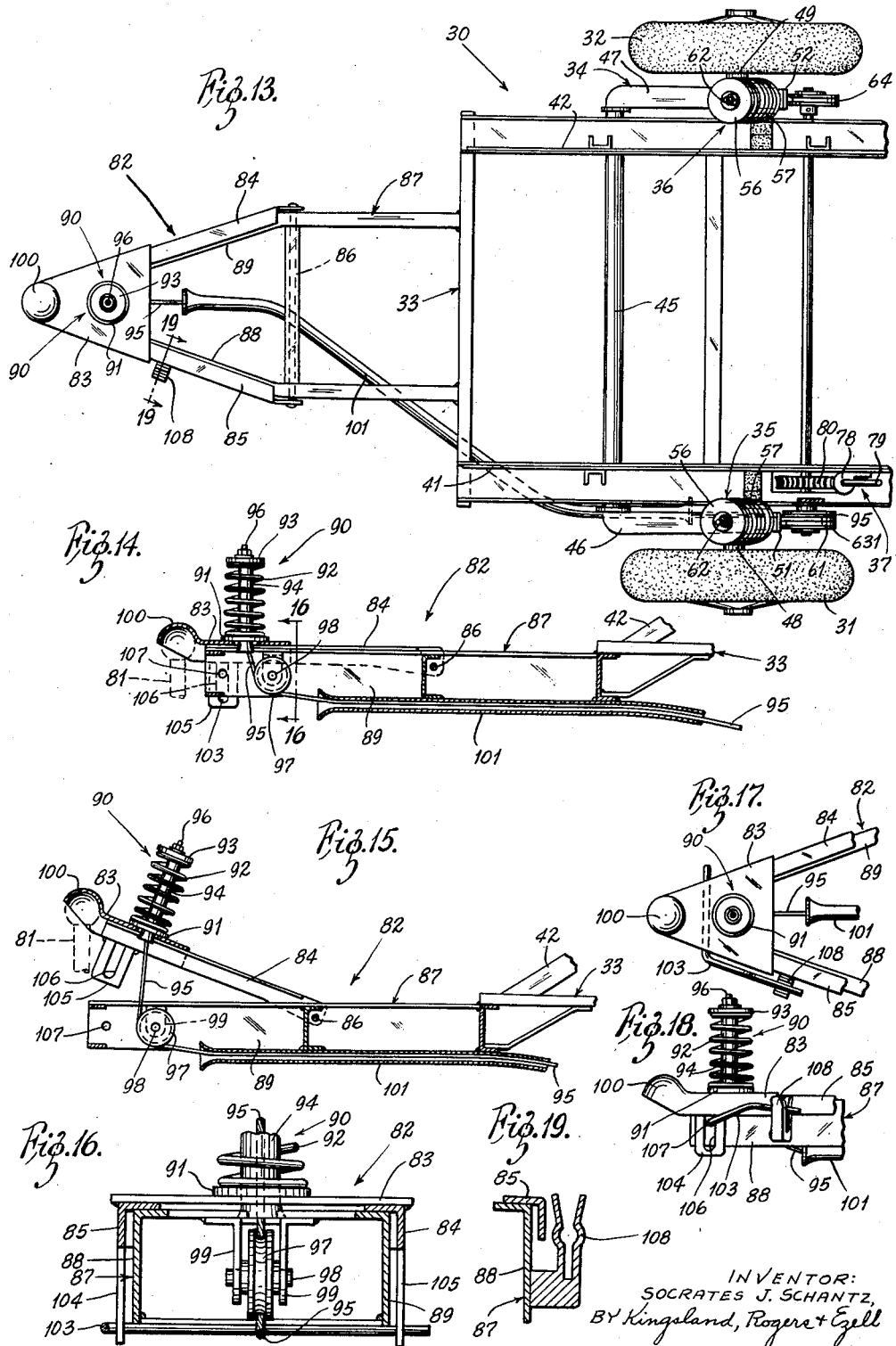

United States Patent Office 2,864,626
Patented Dec. 16, 1958

2,864,626

TRAILER HAVING VERTICALLY ADJUSTABLE HITCH AND RUNNING GEAR

Socrates J. Schantz, St. Louis County, Mo.

Application September 19, 1955, Serial No. 535,025

4 Claims. (Cl. 280—44)

This invention relates to vehicular trailers and in particular is concerned with a trailer having a vertically adjustable bed.

By means of this invention, there has been provided a trailer having a framework or bed which may be raised and lowered vertically and yet maintained in a horizontal plane. The adjustment means is manipulated by a mechanism for taking up and giving slack to a cable which is connected to a pivotable carriage between the axle of the trailer and the bed. By means of this pivotable arrangement of the carriage and the means for rotating it, the bed may be maintained level and can be adjusted through different vertical heights down to a lower level in which it is resting upon the ground. In addition, spring means are provided between the carriage and the frame and the axle of the trailer whereby shocks encountered during the normal passage of a trailer over roads can be largely absorbed. This is of great advantage and makes the trailer useful where livestock or other loads subject to damage due to shocks are hauled.

In addition, there has been provided through this invention a hitch which may be connected to the trailer and which has a pivotally adjustable structure so that the trailer bed may be lowered from a stationary hitch without disconnecting the hitch. Through the pivotably adjustable hitch, the bed of the trailer can be maintained level throughout its vertical adjustment.

Further means for providing the vertical adjustment and the pivotable arrangement of the hitch are provided through a unitary adjustment device which can be operated by a conventional crank, hydraulic means or a motor where desired. The provision of cables through the adjusting elements makes the apparatus easy to operate and simple to maintain. The entire apparatus is relatively simple in construction yet is extremely rugged and requires no complicated operating mechanisms.

Accordingly, it is an object of this invention to provide a trailer having a vertically adjustable bed which may be maintained level in its different positions.

It is a further object of this invention to provide a trailer having a bed connected to the axles of the trailer in vertically adjustable relation thereto by a pivotable carriage.

Still another object of this invention is to provide a trailer having a vertically adjustable bed in which the adjustment can be made through a cable and a drum.

Yet a further object of this invention is to provide a trailer having a vertically adjustable bed which is mounted on the axle of the trailer by a pivotable carriage and in which shock-absorbing means are provided.

Yet a further object of this invention is to provide a trailer having a vertically adjustable bed in which the bed is pivoted at one end to a carriage pivotably connected to the axle of the trailer and in which adjustment is made through the other end of the carriage to effect the raising and lowering of the bed.

Still another object of this invention is to provide a trailer hitch which can be raised and lowered while still hitched to a hitched support.

Yet a further object of this invention is to provide a trailer hitch having a trailer supporting arm which can be raised or lowered in cooperation with a vertically adjustable bed of a trailer.

Still a further object of this invention is to provide a trailer hitch having a trailer supporting arm which can be raised or lowered while the hitch is maintained in the hitch secured position with a spring, and shock-absorbing means to prevent shock to the apparatus.

Still another object of this invention is to provide a trailer having a vertically adjustable bed and a hitch which has a trailer supporting arm that can be raised and lowered while the hitch is in the hitch position and in which the aforesaid raising and lowering can be effected by a single operating force.

Yet another of this invention is to provide a trailer and hitch in which a bed may be vertically adjusted and maintained in a horizontal and level position with shock-absorbing means.

Still another object of this invention is to provide a trailer having a vertically adjustable bed and a vertically adjustable hitch with a trailer supporting arm, which apparatus is rugged in construction and easy to operate and maintain.

Further objects of this invention will appear in the detailed description which follows and will be further apparent to those skilled in the art.

Reference will now be had to the accompanying drawings in which a preferred embodiment of this invention is illustrated. It is to be understood that these drawings are for the purpose of illustration and example only and that the invention is not limited thereto. In the drawings:

Figure 1 is a plan view of the trailer;

Figure 2 is a view partly in section taken on the line 2—2 of Figure 1;

Figure 3 is a side view partly in section taken on the line 3—3 of Figure 1;

Figure 4 is an enlarged view in section taken on the line 4—4 of Figure 1 and showing in detail the adjustment operating mechanism;

Figure 5 is a view in section taken on the line 5—5 of Figure 4 showing the adjustment operating mechanism;

Figure 6 is an enlarged view in rear elevation showing one of the cable drums;

Figure 7 is a view in front elevation of the cable drum of Figure 6;

Figure 8 is a detailed plan view of the cable securing clamp;

Figure 9 is an enlarged view in section taken through the axis of the shock-absorbing spring and showing the means for securing the cable to the carriage;

Figure 10 is a view in section taken on the line 10—10 of Figure 9;

Figure 11 is a view taken similarly to Figure 2, but showing the bed in a lowered position;

Figure 12 is a view also taken similarly to Figure 2, but showing the bed in a still further lowered position;

Figure 13 is a plan view showing an adjustable hitch which can be used with the trailer of this invention;

Figure 14 is a view in section taken through the axis of the hitch and its trailer supporting arm;

Figure 15 is a view similar to Figure 14, but showing the pivoting adjustment of the trailer supporting arm in its lowered position;

Figure 16 is an enlarged view in section taken on the line 16—16 of Figure 14 and portraying the adjusting means;

Figure 17 is a fragmentary plan view of the front of the hitch showing a lock member;

Figure 18 is a view in side elevation of the front of the hitch and the lock member; and Figure 19 is a view in section taken on the line 19—19 of Figure 13 showing the lock holder.

The trailer is generally indicated at 30 in Figures 1 and 2. The main components of the trailer are the wheels 31 and 32, the adjustable bed or frame generally indicated at 33, the carriage 34, the shock-absorbing springs 35 and 36 and the adjustment mechanism generally indicated at 37.

The bed 33, as shown in Figures 1 and 2, comprises a flat skeleton frame which is obviously adapted to support a chassis or a floor of any nature. A cantilever superstructure indicated at 41 and 42 provides for added rigidity and strength. Depending from the bed at both of its sides are journals 43 and 44 which receive the carriage shaft 45.

The carriage 34 includes two side members 46 and 47, both of which are identical in construction and are generally triangular in configuration. As shown in Figures 2 and 3, one apex of the triangle is journaled onto the shaft 45 for rotatable relationship therewith, while an opposite apex is connected to the axles 48 and 49 for the two wheels 31 and 32, respectively. In addition, both of the carriage side members 46 and 47 have mounting extensions 51 and 52 at the third apex upon which the shock-absorbing mechanisms 35 and 36 are positioned. The shock-absorbing mechanisms are connected to the adjustment mechanism 37, as will appear below.

The shock-absorbing mechanisms 35 and 36 are identical in construction and the details are more particularly shown in Figure 9. As shown therein, each assembly includes a lower plate 53 secured to the aforementioned mounting extensions. The lower plate is provided with a central opening 54 within which a cable may be passed. The top of the shock-absorbing mechanism comprises a top plate 56 which is spaced apart from the bottom plate 53 by a shock-absorbing heavy duty coil spring 57. A guide sleeve 58 is welded to the top plate and serves to guide the cable in the shock-absorbing mechanism.

The carriage is operatively secured to a cable at both of its side members in the following manner. The carriage side member 46 at the shock-absorbing mechanism 35 is connected to a cable 61 by securing it to an eyebolt 62 fastened to the top plate 56 in adjustable relationship. The other end of the cable 62 is secured to a drum 63. In like manner, the shock-absorbing mechanism 36 is connected to a cable 64. The other end of the cable 61 is connected to a drum 63 which is secured to a shaft 65 supported by journals 66 depending from the bottom of the bed. In similar fashion, a drum 67 is secured on the other end of the shaft 65 and receives the free end of the cable 64.

The drum 63 is shown in more particular detail in Figures 6, 7 and 8, together with the means for securing the cable to the drum. As shown in these figures, a clamp 71 is secured to the face of the drum 63 shown in Figure 6. Means are provided for receiving the cable in doubled-over fashion through recesses 72 and 73 with the cable passing underneath the shaft 65. The clamp is adapted to be tightened down and secured by the threaded bolts 74. The securing of the cable 64 to the drum 67 is made in identical fashion.

The operating mechanism 37 for adjusting the bed to its different vertical positions is best shown in Figures 1, 3, 4 and 5. As shown therein, this mechanism includes a worm gear 76 supported by a first bracket 77 connected to the bottom of the bed 33 and a second bracket 78 connected to the cantilever support 41. In the second bracket a crank handle 79 is received. Meshing with the worm gear 76 is a gear wheel 80 which is keyed to the shaft 65 to which the two drums 63 and 67 are also keyed. This mechanism, therefore, provides means for driving the drums through the shaft 65 when the crank handle 79 is operated, and it will be obvious that slack in the cables 61 and 64 can either be taken in or let out, depending upon the direction of rotation.

The hitch of this invention is shown in Figures 13 to 19, inclusive. It is shown as connected to a conventional ball hitching element 81 shown in dotted lines in Figure 14 which, it should be understood, can be supported on the back of a vehicle in the normal manner. The hitch, generally indicated at 82, comprises a triangular hitch plate 83 having a hitched socket 100 at the front which is adapted to fit over the ball hitch 81. The hitch plate 83 is connected to a triangular frame including spreading channel members 84 and 85. The free ends of the members 84 and 85 are journaled to a shaft 86 passing through a trailer support arm 87.

The support arm 87, generally indicated by this reference element, is connected by welding to the bed 33 of the trailer 30. The front of the support arm includes two converging members 88 and 89 which mate, respectively, with the members 85 and 84 of the hitch frame.

The adjusting means for securing the support arm to the hitch frame includes a shock-absorbing member generally indicated at 90 which is similar in construction to the shock-absorbing members 35 and 36 previously described for the trailer bed. Thus, there is a bottom plate 91 provided with an opening and which is secured to the hitch plate 83. A spring 92 separates the bottom plate from a top plate 93 and a tube 94 fits within the helical spring and is secured to the top plate 93 and is disposed through the plate opening in relation to the bottom plate and the frame plate 83 through which it extends. A cable 95 is adjustably secured to the top plate 93 by an eye-bolt 96 and extends around a pulley wheel 97 secured on a shaft 98 journaled in a bracket 99.

To guide the hitch cable 95, a guide tube 101 is secured to the bottom of the support arm 87 and also to the bottom of the trailer bed 33, as shown in Figures 13, 14 and 15. The rear of the guide tube 101 passes underneath the carriage side member 46 up to adjacent a double cable drum 631. The cable drum 631 is identical to the cable drum 63 with the exception that two cable grooves are provided so that it can receive the hitch cable 95 and the bed adjusting cable 61.

In order to provide a secure lock for the hitch and also to provide for limited adjustment of the hitch with a safety lock, a locking bar 103 is provided, as shown in Figures 14, 16, 17 and 18. To accommodate this locking bar, guide brackets 104 and 105 are secured to the front of the frame plate and depend therefrom. Both of these guide brackets are provided with slots 106. The forward ends of the members 88 and 89 of the support arm are also provided with circular openings 107 which are adapted to receive the lock bar. To secure the lock bar to the frame, a clamp 108 is fastened to the side of the member 88 of the trailer support arm.

The lock bar 103 fits in the slots 106 underneath the members 88 and 89, as shown in Figure 14, when the support arm is locked to the hitch frame in immovable position. This permits no adjustment of the hitch or lowering of it in any manner and provides a secure and positive lock. The lock bar is positioned as shown in Figure 18 in the slots 106 and the openings 107 of the members 88 and 89 when limited movement and adjustment of the hitch are desired. It will be evident that in this position the lock bar permits the member 88 to be lowered until the bar contacts the bottom of the slot 106.

*Operation*

The operation of the trailer adjusting means is best understood by a reference to Figures 2, 3, 4, 11 and 12. The bed is shown in its highest position in Figures 2 and 3 relative to the ground. To lower the bed, the worm gear crank handle 79 shown in Figure 4 in detail is rotated in a counterclockwise direction. This causes the gear 80 to move in a clockwise direction. The two cable drums 63 and 67 will move in the same fashion as they are commonly keyed to the shaft 65. This causes slack to be played out for cables 61 and 64 so that the carriage side members 46 and 47 are free to rotate about the shaft 45 and lower the bed to the position shown in Figure 11. The weight of the trailer bed itself causes the lowering as slack is played out in the cables due to the positioning of the carriage with respect to the carriage shaft 45 and the wheel axle.

As the crank 79 is continued to be turned in the counter-clockwise direction, a lowering to the further position shown in Figure 12 will take place. Thus the bed can be lowered until its bottom rests upon the ground. This is of obvious advantage in loading and unloading livestock to a trailer. Of equal advantage is the fact that a trailer can be directly loaded with inanimate objects which can be brought into it on wheeled dollies and the like without the use of a loading dock.

The bed may be returned from the position shown in Figure 12 to the positions shown in Figures 11 and 3 by a reversal of the direction of the rotation of the handle 79 and rotating it in a clockwise direction. This will take up the slack in the cables and cause the carriage side members to return to the position shown in Figures 11 and 3, depending upon the amount that the handle 79 is turned. It will be noted that throughout reference has been to a crank handle and a manual operation, but it will be understood that a motor actuated worm gear can be used or any other source of power can be provided.

The structural arrangement of the bed, together with its adjustment means for the trailer, provide a very smooth riding. The shock-absorbing mechanisms 35 and 36 connect the bed to the carriage side members through the cable and permit relative movement to absorb force due to bumps and the usual rough road hazards. The springs in the shock-absorbing assemblies take up these shocks. As a result, the bed is maintained level and without any undue vibration or bouncing as it is towed along.

The hitch 82 shown in Figures 13 to 19 may be advantageously used with the trailer of this invention to support it when it is raised or lowered. When the trailer is in the rest position and is not being towed the lock bar may be withdrawn and operation of the crank handle 79 will either take up or give slack to said hitch cable depending upon the degree of rotation. Thus when the crank handle 79 is turned in the counterclockwise direction slack is let out to the trailer carriage side members through cables 61 and 64 and also to the hitch cable 95. This will cause the trailer support arm to be lowered to the position shown in Figure 15 with the hitch plate and hitch socket 100 being kept upon the stationary ball hitch. Thus no disconnection of the hitch is required.

Conversely, when the trailer is desired to be raised, the bed may be maintained in the level position through the simultaneous taking up of slack in the hitch cable 95 and in the cables 61 and 64 by reversing the rotation of the crank 79.

For free riding or shock-absorbing action, the lock bar 103 may be inserted through the openings at the forward ends of the members 88 and 89 and through the slots 107 of the guide brackets as shown in Figure 18. Then when a vehicle tows the trailer the side arm is permitted to move with respect to the hinge plate a distance corresponding to the position of the bar 103 shown in Figure 18 for the upper limit down to the bottom limit when the bar contacts the bottom of the slot 107. The spring 92 at the top of the hinge plate will take up any shock force that will be normally encountered in the usual road condition. Thus, to prevent any disengagement of the apparatus and to provide a safety, the relative movement between the members 88 and 89 of the trailer support arm and the hitch plate is limited by the degree of freedom of the lock bar 103 which cannot move below the lower limit of the slot 107 in the guide brackets. This provides an efficient safety in operation.

Where it is desired to use a positive lock and to dispense with the shock-absorbing features of the hitch, the lock bar 103 can be withdrawn from the holes in the forward ends of the members 88 and 89 and positioned as shown in Figures 14 and 16. In this situation the lock bar will be between the bottom surface of the members 88 and 89 and the bottom of the slot 107 in the guide brackets so that the members 88 and 89 are locked and cannot move relative to the hitch plate.

It will be apparent that various changes and modifications may be made in this apparatus as will be apparent to those skilled in the art without avoiding the teaching in this invention. Such changes and modifications are within the scope of the invention and are intended to be protected by the claims as appended hereto.

What is claimed is:

1. A trailer hitch for lowering and raising a trailer support arm which comprises a hitch plate having a socket adapted to be connected to a stationary ball hitch secured to a towing vehicle, said trailer support arm being pivotally secured to the hitch plate to the rear of the socket and extending forwardly thereof underneath said hitch plate, means for raising and lowering the trailer support arm while the trailer is hitched to a tow vehicle, comprising extensible means between the hitch plate and the trailer support arm, and shock-absorbing means cooperating with the extensible means including a biasing element to counteract the transmission of shock forces between the hitch plate and the trailer support arm.

2. A trailer hitch for lowering and raising a trailer support arm which comprises a hitch plate having a socket adapted to be connected to a stationary ball hitch secured to a towing vehicle, said trailer support arm being pivotally secured to the hitch plate to the rear of the socket and extending forwardly thereof underneath said hitch plate, means for raising and lowering the trailer support arm while the trailer is hitched to a tow vehicle, comprising a cable secured to the hitch plate on a biased mounting and passing in supporting relation underneath a pulley wheel mounted on the trailer support arm, and means for giving and taking up slack in said cable to effect the raising and lowering of said support arm.

3. A trailer hitch for lowering and raising a trailer support arm which comprises a hitch plate having a socket adapted to be connected to a stationary ball hitch secured to a towing vehicle, said trailer support arm being pivotally secured to the hitch plate to the rear of the socket and extending forwardly thereof underneath said hitch plate, means for raising and lowering the trailer support arm while the trailer is hitched to a tow vehicle, comprising extensible means between the hitch plate and the trailer support arm, shock-absorbing means cooperating with the extensible means including a biasing element to counteract the transmission of shock forces between the hitch plate and the trailer support arm, and means for selectively locking the trailer support arm and the hinge plate in immovable relation and in movable relation between upper and lower fixed limits.

4. A trailer having a vertically adjustable bed, said trailer including a pair of wheels, a bed, and carriage means for connecting said bed to the wheels, said carriage being pivotably connected to the bed and the wheels and including means for separately connecting the bed to the carriage in an adjustable relationship whereby the bed may be raised and lowered with respect to the wheels and in parallelism with the ground, said last named means including a cable fastened at one end to the carriage and engaged at a point spaced from said end by a cable adjustment member secured to the bed, a trailer hitch for raising and lowering a trailer support arm connected to said bed which comprises a hitch plate having a socket adapted to be connected to a stationary ball hitch secured to a towing vehicle, said trailer support arm being pivotally secured to the hitch plate to the rear of the socket and extending forwardly thereof beneath said hitch plate, and means for raising and lowering the trailer support arm comprising a second cable secured at one end to the hitch plate and passing in supporting relation underneath a pulley wheel mounted on the trailer arm with the free end of the cable being secured to said adjustment member for conjoint raising and lowering of the bed and the trailer support arm when said cable adjustment member is adjusted.

References Cited in the file of this patent

UNITED STATES PATENTS

| | | |
|---|---|---|
| 2,141,781 | Allen | Dec. 27, 1938 |
| 2,515,379 | Paine | July 18, 1950 |
| 2,577,246 | Hill | Dec. 4, 1951 |
| 2,621,942 | Getz | Dec. 16, 1952 |
| 2,684,021 | Ratzlaff | July 20, 1954 |